United States Patent
Chadha

[19]

[11] Patent Number: 6,055,631
[45] Date of Patent: Apr. 25, 2000

[54] METHOD AND APPARATUS FOR BOOTING A PORTABLE COMPUTING DEVICE

[75] Inventor: Tejpal S. Chadha, San Jose, Calif.

[73] Assignee: Intel Corporation, Santa Clara, Calif.

[21] Appl. No.: 08/994,028

[22] Filed: Dec. 18, 1997

[51] Int. Cl.[7] .................................................. G06F 9/06
[52] U.S. Cl. ...................................................... 713/2
[58] Field of Search ................................. 395/652, 651, 395/653, 500, 281; 713/1, 2, 100; 710/101; 709/301

[56] References Cited

U.S. PATENT DOCUMENTS

| | | | |
|---|---|---|---|
| 4,621,363 | 11/1986 | Blum | 371/25 |
| 4,752,870 | 6/1988 | Matsumura . | |
| 4,885,770 | 12/1989 | Croll . | |
| 4,943,911 | 7/1990 | Kopp et al. . | |
| 5,280,627 | 1/1994 | Flaherty et al. . | |
| 5,325,529 | 6/1994 | Brown et al. . | |
| 5,367,688 | 11/1994 | Croll . | |
| 5,452,454 | 9/1995 | Basu . | |
| 5,497,492 | 3/1996 | Zbikowski et al. | 395/700 |
| 5,590,340 | 12/1996 | Morita et al. | 395/750 |
| 5,668,977 | 9/1997 | Swanstrom et al. | 395/500 |
| 5,689,654 | 11/1997 | Kikinis et al. | 395/281 |
| 5,822,405 | 10/1998 | Astarabadi | 379/88 |
| 5,822,582 | 10/1998 | Doragh et al. | 395/652 |

*Primary Examiner*—Joseph E. Palys
*Assistant Examiner*—Omar A. Omar
*Attorney, Agent, or Firm*—Thomas R. Lane

[57] ABSTRACT

A method of booting a portable computing device or a personal digital assistant (PDA) is described. In one embodiment, the PDA comprises a boot ROM, a RAM, and a connector for connecting to an external floppy disk drive (FDD). Operating system software and application software for the PDA is stored on a disk in FDD. To boot the PDA, the PDA is connected to the external FDD, then powered up. The PDA is hardwired to begin executing code from the boot ROM, which contains a program to transfer code from the FDD to the RAM, then jump to an entry point in the newly loaded code in the RAM. The PDA is then disconnected from the FDD. To configure the PDA with different operating system and/or different application software, the FDD is loaded with a disk storing this different software and the boot process is repeated. Thus, the PDA can be configured to support any number of different operating systems and any number of different applications despite having a limited capacity of RAM.

2 Claims, 2 Drawing Sheets

METHOD AND APPARATUS FOR BOOTING A PORTABLE COMPUTING DEVICE

FIELD OF THE INVENTION

The present invention relates to the field of computer architecture and more particularly to the field of portable computing devices.

BACKGROUND OF THE INVENTION

When a typical computer is powered up, the computer is placed into a known system state through a process known as "booting". This boot process includes the loading of operating system software from a non-volatile data storage device, such as a hard disk, on which the operating system software is permanently stored. The operating system software is loaded into the main system memory of the computer, which is typically a volatile memory such as dynamic random access memory, from which the operating system software is executed.

However, the boot process of a typical portable computing device or personal digital assistant (PDA) does not include the loading of operating system software from a non-volatile data storage device to a main system memory. Instead, the main system memory of the PDA is typically a non-volatile memory such as read-only memory (ROM) or flash memory. The operating system software is permanently stored in and executed directly from this non-volatile memory. Application software for the PDA is also typically stored in and executed from the same non-volatile memory. Therefore, the functionality of the PDA is limited by the capacity of non-volatile memory in the PDA, which is a primary factor in the cost of the PDA. In response to this cost driven limitation to the functionality of a typical PDA, a novel approach to booting a portable computing device has been developed.

SUMMARY OF THE INVENTION

A method of booting a portable computing device is disclosed. First, the portable computing device is connected to a data storage device. Then, operating system software is transferred from the data storage device to the portable computing device. Finally, the portable computing device is disconnected from the data storage device.

DETAILED DESCRIPTION OF A PREFERRED EMBODIMENT

A method and apparatus for booting a portable computing device is described. In the following description, specific details are set forth in order to provide a thorough understanding of the present invention. It will be apparent, however, to one skilled in the art that the present invention can be practiced without regard to these specific details. In other instances, well known concepts have not been described in particular detail in order to avoid obscuring the present invention.

In one embodiment of the present invention, a personal digital assistant (PDA) comprises a boot ROM, a random access memory (RAM), and a connector for connecting to an external floppy disk drive (FDD). Operating system software and application software for the PDA is stored on a disk in the FDD. To boot the PDA, the PDA is connected to the external FDD, then powered up. The PDA is hardwired to begin executing code from the boot ROM, which contains a program to transfer code from the FDD to the RAM, then jump to an entry point in the newly loaded code in the RAM. The PDA is then disconnected from the FDD. To configure the PDA with different operating system and/or different application software, the FDD is loaded with a disk storing this different software and the boot process is repeated. Thus, the PDA can be configured to support any number of different operating systems and any number of different applications despite having a limited capacity of RAM.

Figure 1:
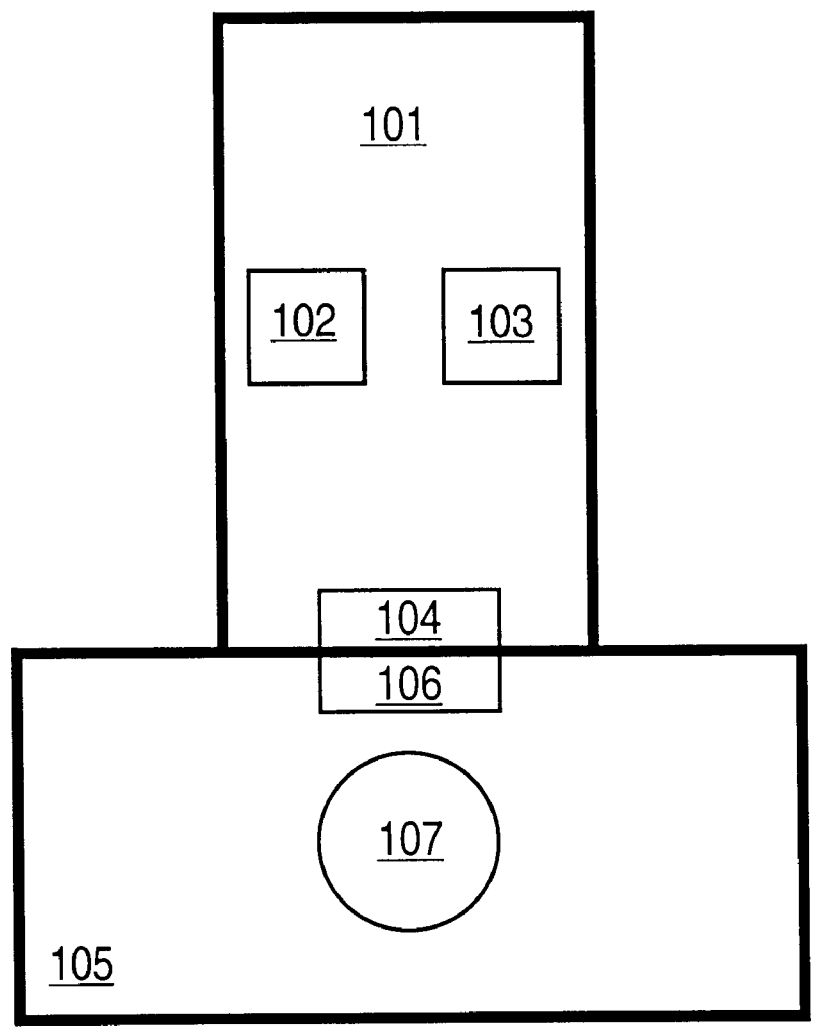
FIG. 1 is a block diagram illustrating one embodiment of the apparatus of the present invention in a computer system.

The above embodiment of the present invention can be described in greater detail with reference to FIG. 1, a block diagram illustrating one embodiment of the apparatus of the present invention, along with FIG. 2, a flow chart illustrating one embodiment of the method of the present invention. In FIG. 1, PDA 101 has a boot ROM 102, a volatile random access memory (RAM) 103, and a data input connector 104. FDD 105 has a data output connector 106 and a removable disk 107. In the embodiment of FIG. 1, PDA 101 executes operating system software and application software from RAM 103, and RAM 103 can also be used to store data. However, other embodiments are possible wherein a different type of memory, such as non-volatile flash memory, is used for one or more of these purposes. Further descriptions of the elements of FIG. 1 will be provided below.

Figure 2:
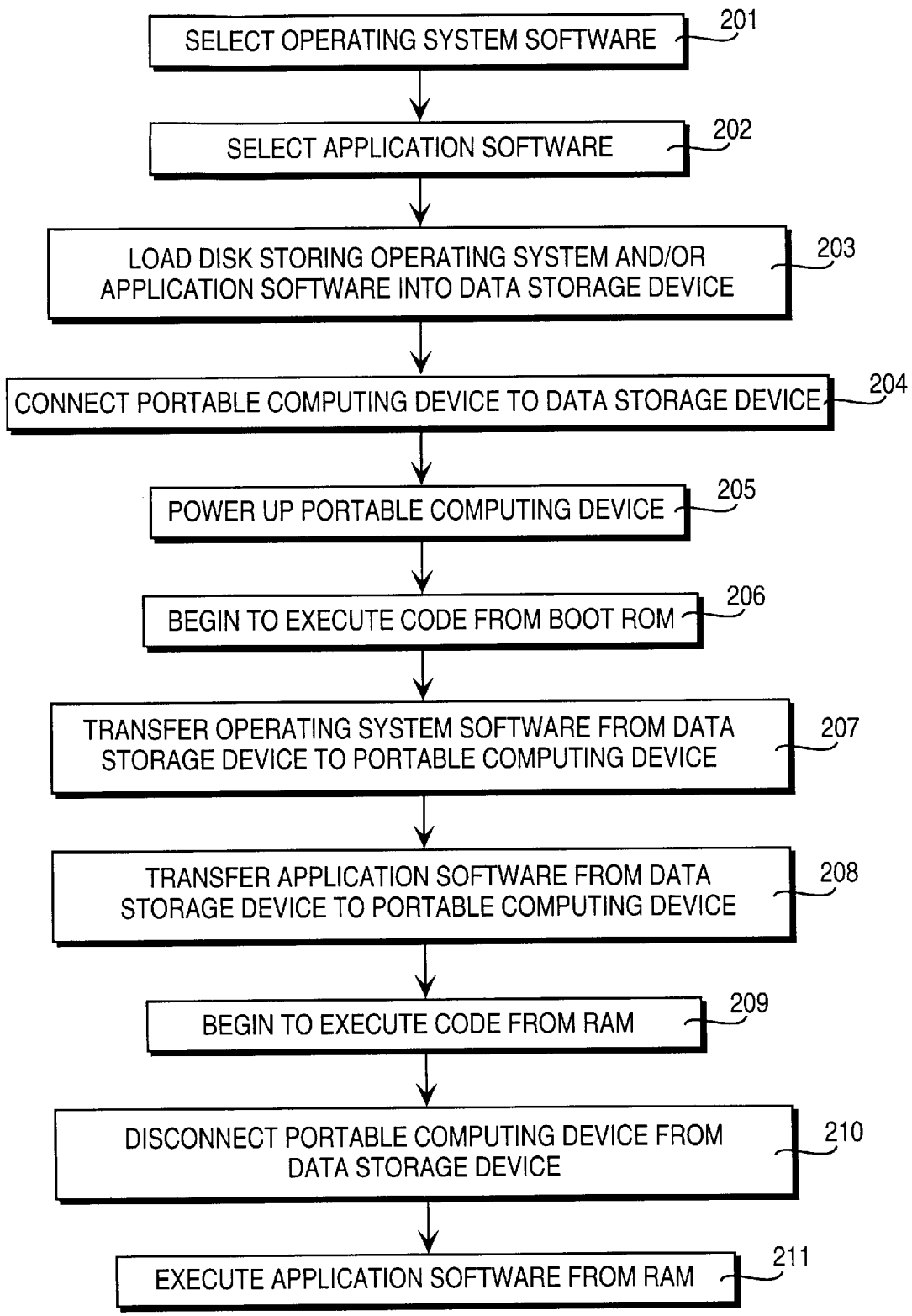
FIG. 2 is a flow chart illustrating one embodiment of the method of the present invention.

In step 201 of FIG. 2, operating system software is selected for use on PDA 101. In one embodiment, the selection includes choosing one of a number of different operating systems that can be run on PDA 101. In another embodiment, the selection includes choosing one of a number of varieties of a single operating system that can be run on PDA 101, such as one of a number of operating system revisions or upgrades. In another embodiment, the selection includes selecting one or more operating system functions that can be supported by PDA 101, such as selecting a device driver for a modem included in PDA 101 when the PDA is to be used for an application requiring the modem.

The selection involved in step 201 can be performed in any way desired. In one embodiment, an application program running on a desktop computer provides a menu listing the operating system software that can be run on the PDA, receives the selection, and transfers the selected operating system software from a hard disk, CD-ROM, server, or other data storage device to disk 107, which for purposes of step 201 has been loaded into the FDD of the desktop computer. In another embodiment, the desired operating system software is selected by selecting disk 107 from a library of disks storing a variety of operating system software.

In step 202, application software is selected for use on PDA 101. In one embodiment, the selection includes choosing one or more of a number of different application programs that can be run on PDA 101, such an address book program, a date book program, or a notepad program. The selection involved in step 202 can be performed in any way desired, including any of the ways described above for the selection involved in step 201. The number of application programs that can be selected for use at any one time is limited by the capacity of RAM 103 and the RAM capacity required for the operating system and each application. However, the number of different application programs that can be run on PDA 101 is not limited by the capacity of RAM 103.

In step 203, disk 107, now storing the selected operating system and/or application software, is loaded into FDD 105.

Although the embodiment of FIG. 1 includes FDD 105 and floppy disk 107, any other type of data storage device, such as a magnetic tape drive, CD-ROM drive, or a hard disk drive, and any other type of computer-readable medium, such a magnetic tape, CD-ROM, or hard disk can be used. In one embodiment, FDD 105 is a standalone device including a dedicated power supply. In another embodiment, FDD 105 is connected to a host or a desktop computer. In this embodiment, step 203 may be unnecessary because disk 107 is already loaded into FDD 105 from one of the previous steps.

In step 204, PDA 101 is temporarily connected to FDD 105 to form an interface connector coupling PDA 101 to FDD 105. In this embodiment, PDA 101 is temporarily connected to FDD 105 by coupling data input connector 104 to data output connector 106 by any known type of physical connection. In another embodiment, wherein the data storage device corresponding to FDD 105 includes a wireless communication port, such as an infrared port, PDA 101 is temporarily connected to the data storage device by establishing a wireless communication connection.

Step 204 can be performed prior to or during any of steps 201, 202, or 203. Data input connector 104 and data output connector 106 can be any known connectors, such as any standard FDD connectors, or any connectors designed with known technology. In one embodiment, data input connector 104 is situated on the bottom of PDA 101, data output connector 106 is in the form of a cradle included in FDD 105, and the temporary connection is made by placing PDA 101 into the cradle. In another embodiment, wherein FDD 105 is connected to a desktop computer by a main connector, data output connector 106 is an auxilliary connector.

In step 205, PDA 101 is powered up or reset. Step 205 can include any action which causes PDA 101 to execute code from a boot address in ROM 102. In one embodiment, wherein PDA 101 has an "off" system state in which no power is supplied to the circuitry of PDA 101 and an "on" system state in which power is supplied to the circuitry of PDA 101, step 205 includes causing the system state of PDA 101 to transition from "off" to "on" by manually toggling a switch or pressing a button. PDA 101 is hardwired to load an instruction pointer register with the boot address during this transition, such that the first instruction executed after the transition is from ROM 102. In another embodiment, wherein PDA 101 includes a reset button which causes the boot address to be loaded into the instruction pointer register whenever the reset button in pressed, step 205 includes pressing the reset button.

In step 206, PDA 101 begins to execute code from ROM 102. ROM 102 can be any non-volatile memory, such as ROM, programmable ROM, erasable programmable ROM, or flash memory. ROM 102 can have any capacity, but in one embodiment, the capacity of ROM 102 is limited to the minimum required to store the boot code necessary to load an operating system into RAM 103. Execution begins with an instruction stored at the boot address in ROM 102, which can be any address that is associated with ROM 102. In one embodiment, the boot address is at the bottom of the address space of ROM 102 (i.e. the lowest address associated with ROM 102). The code stored in ROM 102 starting at the boot address is a program that instructs PDA 101 to perform any tasks required to transfer code from FDD 105 to RAM 103, such as initializing an interface to FDD 105, and then to transfer code from FDD 105 to RAM 103.

In step 207, operating system software is transferred from FDD 105 to RAM 103. The transfer can be performed in a number of ways and can begin from any physical or logical location on disk 107. In one embodiment, FDD 105 is addressed by PDA 101 as an I/O device and transfer begins from a specific I/O address corresponding to a specific location on disk 107 where operating system software has been stored. In another embodiment, FDD 105 is addressed as a memory device and transfer begins from a specific memory address corresponding to a specific location on disk 107 where operating system software has been stored.

Any amount of operating system software can be transferred in step 207. In one embodiment, step 207 includes transferring all of the selected operating system software from FDD 105 to RAM 103. In another embodiment, wherein a portion of the selected operating system software includes instructions to transfer code from FDD 105 to RAM 103, step 207 includes transferring that portion of the selected operating system software, with the remainder being transferred following step 209. In another embodiment, the program stored in ROM 102 instructs PDA 101 to transfer a specific amount of code from FDD 105 to RAM 103, such as an amount corresponding to the capacity of RAM 103 or disk 107. In another embodiment, the program stored in ROM 102 instructs PDA 101 to transfer a variable amount of code from FDD 105 to RAM 103, such as an amount that depends on the format of disk 107 or an amount that depends on the receipt of a transfer termination flag.

In step 208, application software is transferred from FDD 105 to RAM 103. Any amount of application software can be transferred in step 208. In one embodiment, in which the operating system software transferred in step 207 includes instructions to transfer code from FDD 105 to RAM 103, step 208 is performed after step 209. In other embodiments, the amount of application software transferred is determined in one of the ways listed above for step 207.

In step 209, PDA 101 begins to execute code from RAM 103. Step 209 can be accomplished in a number of ways. In one embodiment, the final instruction executed from ROM 102 is a jump instruction that loads an instruction pointer register with the address of the entry point into the operating system now stored in RAM 103. In another embodiment, wherein the boot address is at the bottom of the address space of ROM 101 and the last instruction executed from ROM 101 is at the top of the address space of ROM 101, the address space of RAM 103 is contiguous with and above the address space of ROM 101 and the entry point to the operating system is stored at the bottom of the address space of RAM 103.

In step 210, PDA 101 is disconnected from FDD 105 by decoupling data input connector 104 and data output connector 106. In step 211, PDA 101 begins to execute application software from RAM 103.

Thus, the exemplary embodiments of the present invention illustrated by FIG. 1 and FIG. 2 have been described. However, the invention is not limited to these embodiments or any of the details described. The specification and drawings must be regarded in an illustrative rather than a restrictive sense. The scope of the invention is defined by the following claims.

What is claimed is:

1. A method of booting a portable computing device comprising a non-volatile memory and a volatile memory, said method comprising the steps of:

connecting said portable computing device to a data storage device;

executing an instruction from a first memory location in said non-volatile memory defined by an instruction pointer register to begin transferring operating system software from said data storage device to said volatile memory;

changing the contents of said instruction pointer register to define a second memory location in said volatile memory;

disconnecting said portable computer from said data storage device; and executing an instruction from said second memory location.

2. The method of claim 1 further comprising a step of transferring application software from said data storage device to said portable computing device.

* * * * *

UNITED STATES PATENT AND TRADEMARK OFFICE
CERTIFICATE OF CORRECTION

PATENT NO. : 6,055,631
DATED : April 25, 2000
INVENTOR(S) : Tejpal S. Chadha

It is certified that error appears in the above-identified patent and that said Letters Patent is hereby corrected as shown below:

<u>Column 4,</u>
Line 64, delete " the steps of".

<u>Column 6,</u>
Line 5, delete " a step of".

Signed and Sealed this

Fourteenth Day of May, 2002

*Attest:*

JAMES E. ROGAN
*Attesting Officer*     *Director of the United States Patent and Trademark Office*